United States Patent [19]

Tada et al.

[11] Patent Number: 4,603,096
[45] Date of Patent: Jul. 29, 1986

[54] HOLOGRAM RECORDING MATERIAL

[75] Inventors: Koji Tada; Yoshiki Kuhara; Masami Tatsumi, all of Osaka, Japan

[73] Assignee: Agency of Industrial Science & Technology, Tokyo, Japan

[21] Appl. No.: 684,732

[22] Filed: Dec. 21, 1984

[51] Int. Cl.[4] .............................................. G03H 1/04
[52] U.S. Cl. ......................................... 430/1; 430/2; 430/495
[58] Field of Search ................. 430/1, 2, 495

[56] References Cited

U.S. PATENT DOCUMENTS 3,932,299  1/1976  Phillips ..................................... 430/2
4,052,119  10/1977  Williams et al. ......................... 430/2
4,304,458  12/1981  Huignard et al. ........................ 430/1

OTHER PUBLICATIONS

Amodei et al, Chemical Abstracts, vol. 75, Item 82286h, 1971.
Tiziani et al, Chemical Abstracts, vol. 95, Item 106328q, 1981.

Primary Examiner—J. Travis Brown
Attorney, Agent, or Firm—Cushman, Darby & Cushman

[57] ABSTRACT

A hologram recording material comprises one of bismuth silicon oxide and bismuth germanium oxide, and Fe added to these material. The density of Fe is 10 p.p.m.

3 Claims, 3 Drawing Figures

4,603,096

HOLOGRAM RECORDING MATERIAL

BACKGROUND OF THE INVENTION

The present invention relates to a hologram recording material, and more particularly to such material having high sensitivity and capable of reuse.

Holographic recording and reproduction employing Ar-laser and He-Ne laser is useful for high density image processing and image memory, and such type primarily employs photographic dry plate. However, in employing the photographic dry plate, it is necessary to perform developing and fixing process, so that it is not suitable for real time image processing. Further, the dry plate is not capable of reuse.

Conventionally, a recording material formed from thermoplastic material has been used, which is capable of reuse and real time processing. However, service life of the recording material would rather short due to the utilization of thermal deformation. Further the recording material is weak in moisture.

SUMMARY OF THE INVENTION

It is therefore, an object of the present invention to overcome the conventional disadvantages, and to provide an improved hologram recording material.

Another object of the invention is to provide such recording material having improved real time processing.

Still another object of the present invention is to provide the hologram recording material capable of reuse.

According to the hologram recording material, it contains bismuth silicon oxide or bismuth germanium oxide, and additionally contains 10 p.p.m. iron.

These and other objects o this invention will become apparent from the description of the drawings and the preferred embodiments which follow.

BRIEF DESCRIPTION OF THE DRAWINGS

In the drawings,

FIG. 1 is an explanatory illustration showing a principle of operation in a BSO hologram recording device in which BSO designates bismuth silicon oxide ($Bi_{12}SiO_{20}$), and in the Figure, In FIG. 2, compared is one hologram memory device formed of BSO only, and the other hologram memory device formed of BSO-Fe (10 p.p.m.).

DESCRIPTION OF THE PREFERRED EMBODIMENT

According to recent investigation and researches, it has been found that a hologram recording material capable of real time operation is obtainable by adding impurities into a dielectric material such as $LiNbO_3$ and SBN.

Figure 1A:
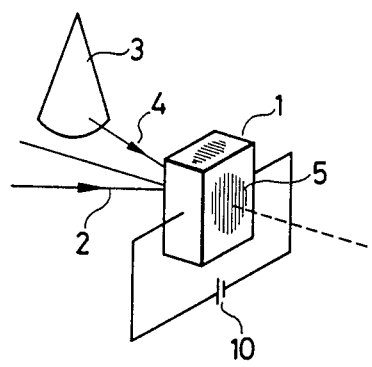
FIG. 1(a) shows momory of a hologram and FIG. 1(b) shows reproduction of the hologram.
Figure 1B:
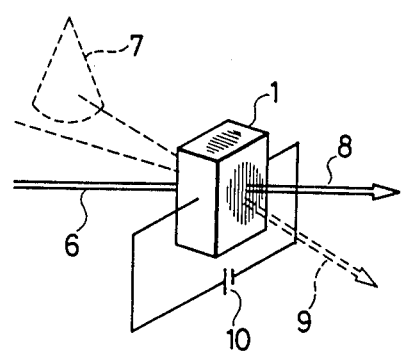

Bismuth silicon oxide ($Bi_{12}SiO_{20}$, hereinafter simply referred to BSO) or bismuth germanium oxide ($Bi_{12}GeO_{20}$, hereinafter simply referred to BGO) provides sufficient light transmitting effect even if no additional element is added thereinto. For example, as shown in FIG. 1(a), a recording material 1 formed of BSO is subjected to projections from reference light 2 and light 3 from an object 3. In this case, interference fringe 5 is provided in the recording material 1, and free electrons are generated in accordance with the light and shade of the fringe 5. In particular, BSO and BGO provide high sensitivity against rays of spectrum violet light and blue light.

The generated free electrons are subjected to drift by an electric field applied by an electric source 10, the field being directed in a direction perpendicular to the interference fringe 5. As a result, spacial charge distribution is formed in conformance with the light and the shape of the fringe with the remaining positive charge. This spacial charge distribution provides spacial refractive index distribution by electro-opto effect provided by crystals of BSO and BGO. Therefore, when reproduction light 6 is projected as shown in FIG. 2(b), a reproduction image 7 is obtained in a manner similar to an ordinary hologram. The reproduction light 6 is selected in a range of red ray to infrared ray so as to avoid photo-conductive effect. In order to erase the stored image, power supply voltage of the power sourse 10 is reduced to zero, and only the reference light is projected over the entire surface of BSO. Reference numerals 8 and 9 designate transmission light and diffraction light, respectively.

The above-mentioned process are entirely electrically performed in order to improve repeated operation of real-time image reproduction and image eraseing. In this connection, it is important to further enhance sensitivities of BSO and BGO, those inherently having high sensitivity, in order to further promote real-time processing.

Inventors of the present invention have conducted researches and investigations with respect to the operation holographic mechanism in using BSO and BGO. Upon investigations, it has been found that the sensitivity (S) and maximum diffraction efficiency (n max) may be improved in accordance with the increase of probability of effective trapping of free electrons at the specific trap level, the electrons being generated by the recording light.

Figure 2:
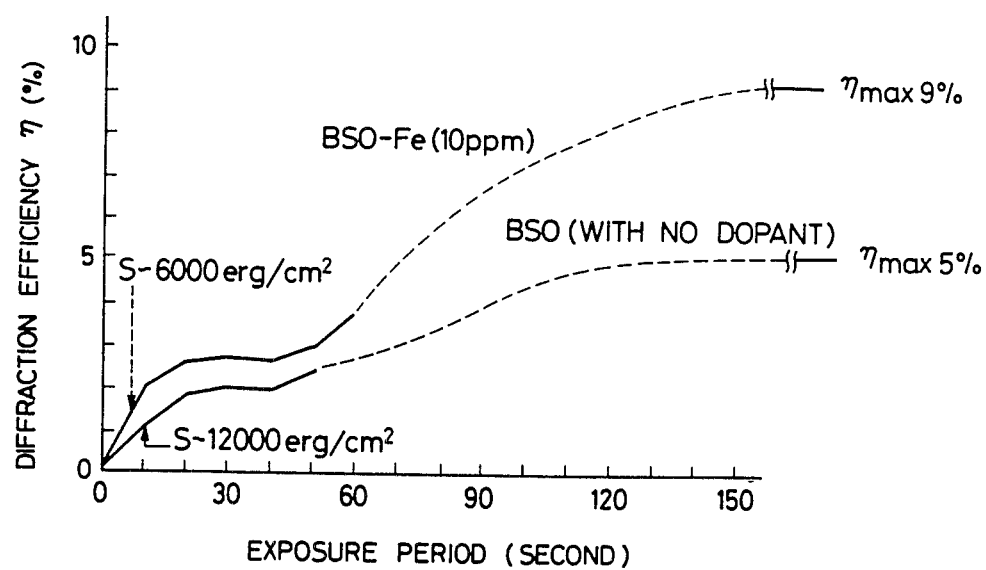
FIG. 2 is a graphical representation showing the relationship between exposure period and diffraction efficiency.

Therefore, measured was the relationship between the diffraction efficiency and exposure period of BSO added with a specific dopant. As a result, as shown in FIG. 2, it was found that the sensitivity of BSO added with 10 p.p.m. of Fe is about twice as high as that of BSO added with no dopant. The same is true with respect to the improvement of the maximum diffraction efficiency. Further, these advantages have been also recognized in case of BGO added with 10 p.p.m. of Fe. Twice increase of the sensitivity leads to the reduction of processing to half time, to thereby obtain twice increase in system efficiency and cost performance. Therefore, the addition of 10 p.p.m. Fe to BSO and BGO is practically efficient.

If the Fe density is less than 10 p.p.m., sufficient effect may not be obtainable. However, if the Fe density is more than 10 p.p.m., light transmission efficiency through crystals is lowered, so that the reproduction image becomes excessively dark.

While the invention has been described in detail and with reference to the specific embodiment thereof, it will be apparent to one skilled in the art that various changes and modifications can be made therein without departing from the spirit and scope of the invention.

What is claimed is:

1. A hologram recording material consisting essentially of a bismuth oxide material which is one selected from bismuth silicon oxide and bismuth germanium oxide, and iron added as a dopant to said bismuth oxide material.

2. A hologram recording material of claim 1, wherein the iron density is 10 p.p.m.

3. A hologram recording material consisting essentially of a bismuth oxide material which is one selected from bismuth silicon oxide and bismuth germanium oxide, and 10 p.p.m. of iron.

* * * * *